United States Patent [19]

Soffer

[11] Patent Number: 4,471,604
[45] Date of Patent: Sep. 18, 1984

[54] FRUIT PICKER

[75] Inventor: Anita I. B. Soffer, Sherman Oaks, Calif.

[73] Assignees: Truper Corporation, San Diego, Calif.; Keller Manufacturing Company, Inc., St. Louis, Mo.

[21] Appl. No.: 422,534

[22] Filed: Sep. 24, 1982

[51] Int. Cl.³ .................................... A01D 46/24
[52] U.S. Cl. ........................................... 56/339
[58] Field of Search ............................. 56/332–340; 604/355

[56] References Cited

U.S. PATENT DOCUMENTS

| | | | |
|---|---|---|---|
| 1,008,470 | 11/1911 | Hube | 56/339 |
| 1,512,680 | 10/1924 | Edstrom | 56/340 |
| 1,670,796 | 5/1928 | Boenig | 56/338 |
| 2,811,007 | 10/1957 | Tredway | 56/336 |
| 4,269,148 | 5/1981 | Holley-Donawa | 604/355 |

FOREIGN PATENT DOCUMENTS 2951013 6/1981 Fed. Rep. of Germany ........ 56/339

Primary Examiner—Jay N. Eskovitz
Attorney, Agent, or Firm—Jack C. Munro

[57] ABSTRACT

A fruit picker which takes the form of an elongated handle section which is secured at its outer end to a ring shaped member. The lower surface of the ring shaped member is secured to a collecting container, such as a bag. The upper surface of the ring shaped member is hiatused in the form of a scalloped arrangement. The stem of the fruit is to connect with a scallop with the fruit itself to be located interiorly of the ring shaped member and by exerting force against the stem will cause the stem to break resulting in the fruit being separated from the tree and falling within the collecting container.

1 Claim, 10 Drawing Figures

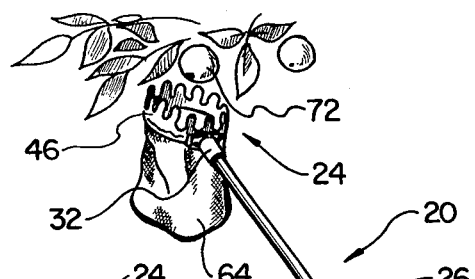
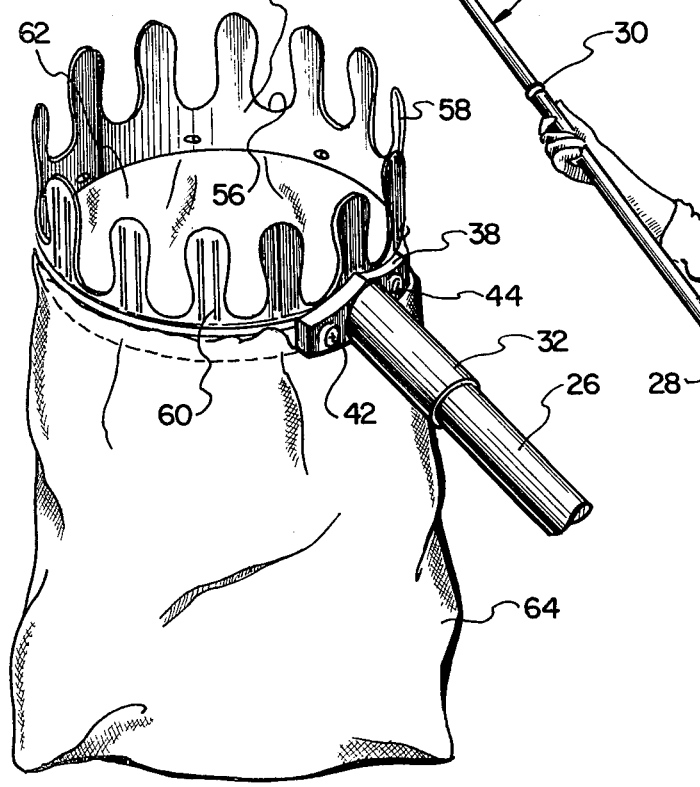
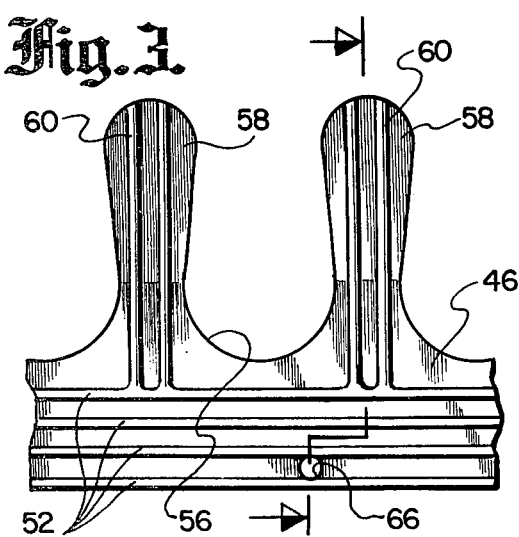
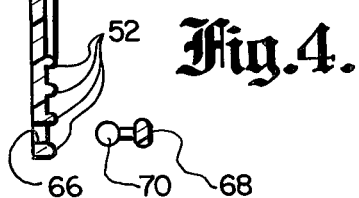

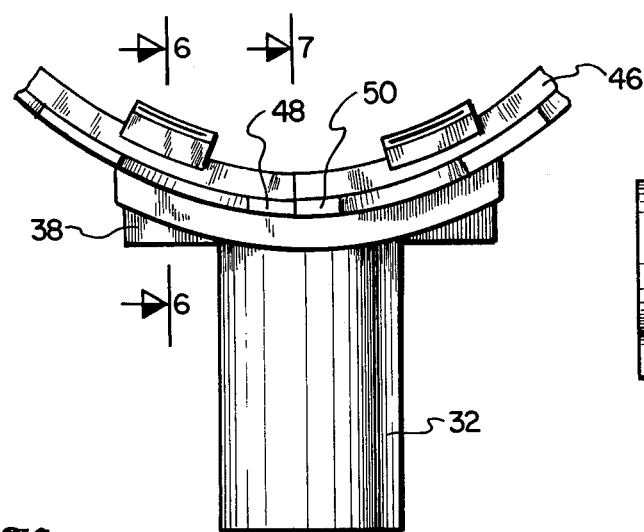
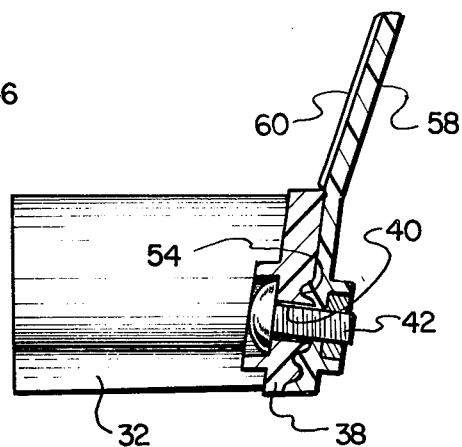
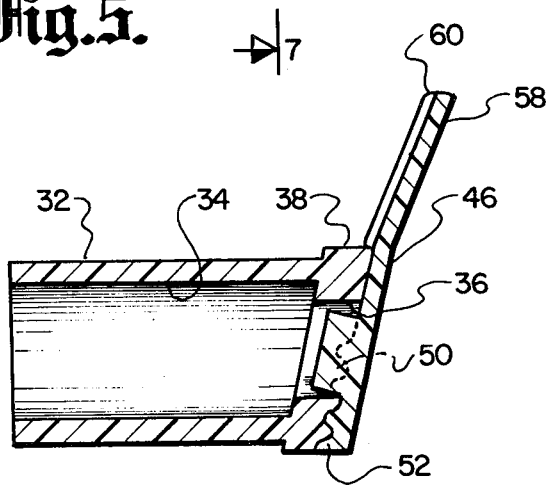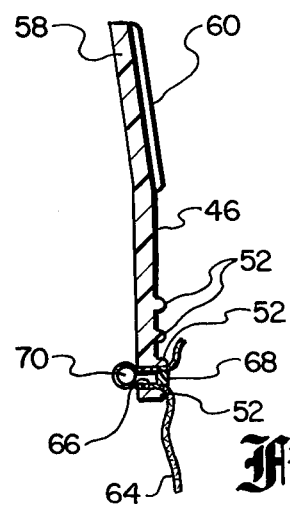
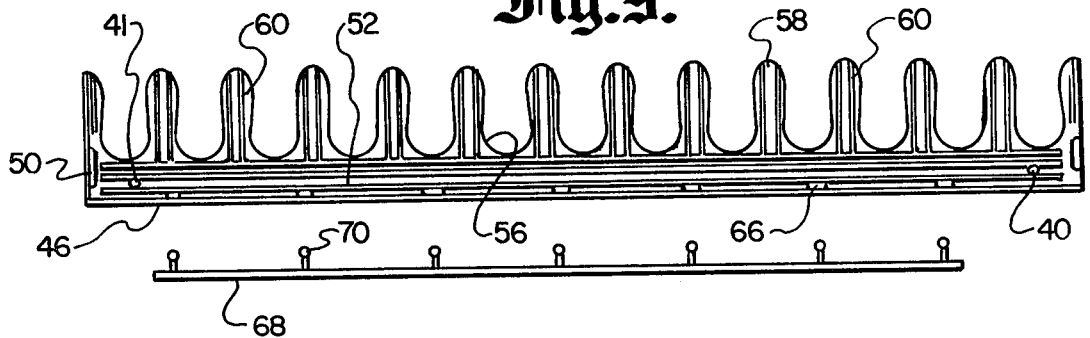

FRUIT PICKER

BACKGROUND OF THE INVENTION

The field of this invention relates to tools and more particularly to a tool which facilitates the picking of fruit from trees and which does not require the user to use a ladder but can pick the fruit while standing on the ground.

Fruit trees, such peach trees, apple trees and orange trees normally reach a height of fifteen to twenty feet from the ground. When the fruit becomes ripe, it is necessary to pick the fruit from the trees.

In commercial fruit picking operation, there may be utilized tree shaking equipment which will cause the fruit to be separated from the tree and thereby be collected. However, an average homeowner, who has just a few fruit trees, will find it impractical to invest in such tree shaking equipment. This means that the individual must pick the fruit from the tree, not only in the lower branches of the tree, but from the upper branches as well.

The normal method of picking fruit from the upper portion of the tree is to use a ladder. Using a ladder makes it very difficult to get into the interior portion of the tree to pick the fruit. Also, it is necessary for the user to be constantly moving the ladder about the tree. Additionally, because the terrain may not be completely level or can be soft due to moisture, the use of a ladder can be inherently dangerous. Ladder accidents are common occurrences when such are used to pick fruit.

Previously there have been attempts at constructing a fruit picking device. However, in the past, such fruit picking devices generally incorporate some type of a cutting means which is movable to accomplish the cutting action. Inherently, such fruit picking devices are complex in construction. In turn, such complexity significantly increases manufacturing costs, therefore causing such fruit picking devices to be expensive.

SUMMARY OF THE INVENTION

One objective of this invention is to construct a fruit picking device which can be manufactured inexpensively and, therefore, sold to the ultimate user at a relatively low cost.

Another objective of this invention is to not incorporate any moving part within the fruit picking device thereby further lowering the manufacturing cost.

Another objective of this invention is to construct a fruit picking device which can be easily used be even the most unskilled individual.

The fruit picking device of this invention includes an elongated handle which is adjustable in length. A strip of bendable material is to be bent substantially in the shape of a circle with the ends of the strip abutting each other. This now ring shaped strip of material is secured to the outer end of the handle. A collecting container, usually in the form of a bag, is secured to the ring shaped member. This securing is accomplished by a connecting band which includes a plurality of protuberances. Each protuberance is to force a small portion of the bag through an opening formed within the ring shaped member. The upper surface of the ring shaped member is scalloped. The stem of a piece of fruit on the tree is to rest within one of the scallops and upon forcing of the ring shaped member against the stem, the stem will break which permits the fruit to fall within the collecting container.

BRIEF DESCRIPTION OF THE DRAWINGS

FIG. 1 is a perspective view of the fruit picker of the present invention depicting usage of such to remove a piece of fruit from a tree;

FIG. 2 is a perspective view of the outer end of the fruit picker of FIG. 1;

FIG. 3 is a side view of a portion of the ring shaped member included within the fruit picker of the present invention;

FIG. 4 is a cross-sectional view taken along line 4—4 of FIG. 3 depicting the collecting container attachment arrangement;

FIG. 5 is a top plan view of a portion of the ring shaped member clearly showing the attachment to the handle;

FIG. 6 is a cross-sectional view taken along line 6—6 of FIG. 5;

FIG. 7 is a cross-sectional view taken along line 7—7 of FIG. 5;

FIG. 8 is a view similar to FIG. 4 but showing the collecting container secured to the ring shaped member;

FIG. 9 is a side elevational view of the elongated strip which is to be bent to form the ring shaped member attached to the outer end of the handle; and FIG. 10 is a top plan elevational view of the connecting band which is utilized to secure the collecting container to the ring shaped member.

DETAILED DESCRIPTION OF THE SHOWN EMBODIMENT

Referring particularly to the drawings, there is shown the fruit picker 20 of this invention which is composed generally of a handle assembly 22 and an operating end 24. The handle assembly 22 is constructed of rigid, thin walled tubing, such as aluminum tubing and is composed of members 26 and 28 which are connected together in a telescoping manner. When extended to the desired position, the member 26 can be secured to the member 28 by means of a clamping ring 30. It is to be noted that the basic construction of the handle assembly 22 does not form any specific part of this invention and any convenient handle assembly could be utilized whether it is adjustable or not. It happens to be that an adjustable handle assembly 22 is preferred so as to decrease the amount of space which the fruit picker 20 takes up when not in use and in storage.

The outer end of the handle section 26 is secured within opening 34 formed within a sleeve 32. The inner end of the opening 34 is closed with the exception of smaller opening 36. The inner end of the sleeve 32 is centrally mounted within an attaching flange 38.

Formed with the attaching flange 38 are a pair of spaced apart holes 40 and 41. A bolt fastener 42 is mounted through the hole 40. A similar bolt fastener 44 is located through hole 41.

A strip 46 is to be formed of plastic or other similar type of bendable material and is to be bent in substantially a circle with the ends abutting, thereby forming a ring shaped member which is a major component of the operating end 24. Protruding outwardly from the surface of the strip 46 at one end thereof is a first protuberance 48. A second protuberance 50 protrudes outward from the surface of the strip 46 at the opposite end thereof. With the ends of the strip in abutting relation and the protuberances 48 and 50 also abutting, the protuberances 48 and 50 are to be snugly located within the opening 36. The exterior wall of the strip 46 includes a series (four in number) of elongated ridges 52. Three in number of the ridges 52 are to connect with grooves 54 formed within the flange 38. It can thus be seen that when the bolts 42 and 44 are tightened, an extremely solid unit is formed between the sleeve 32 and the strip 46 due to the interlocking action between the grooves 54 and the ridges 52 and also with the protuberances 48 and 50 being located within the opening 36.

The upper edge of the strip 46 is scalloped to form recesses 56 which are located between protrusions 58. It is to be noted that there are twelve in number of the protrusions 58, with there being a half a protrusion at each end of the strip 46. When the ends of the strip 46 are joined together, there will be formed a completed protrusion. It is to be understood that the actual number of the protrusions 58 are deemed to be a matter of choice of design. For providing strength to each of the protrusions 58, there are formed within the exterior surface a pair of strengthing ribs 60.

It is to be noted that when the strip 46 is located in a ring, it forms an internal chamber 62. Each of the protrusions 58 are slightly bent in the direction toward the internal chamber 62. The bent configuration is clearly shown in FIGS. 4, 6, 7 and 8. The reason for the bending of the protrusions 58 is that it facilitates the locating of a stem of the fruit within a recess 56 to prevent the outer end of each of the protrusions 58 from getting caught in a tree branch. It is noted that the outer surface of each protrusion 58 is rounded so as to further avoid the possibility of any "hanging up" of the strip 46 on any portion of the tree.

It is desirable to connect some form of a collecting container to the strip 46. A preferable type of collecting container can either be a chute or a bag, such as the bag 64 as shown. The bag 64 can be constructed of any type of material, such as fabric, plastic or paper.

Formed within the strip 46 adjacent the lower edge thereof are a plurality of spaced apart openings 66. It is to be noted that there are seven in number of the openings 66. However, it is considered to be within the scope of this invention that any convenient number could be utilized. A thin strip in the form of a band 68 includes a plurality of small protuberances 70 extending therefrom. It is noted that the spacing between the small protuberances 70 is equal to the spacing between the openings 66. The operator is to locate the bag 64 over the openings 66 and then proceed to install the band 68 in position by pushing a single, small protuberance within its respective opening 66 which forces a segment of the material of the bag 64 through the opening 66. This results in securing of the bag 64 and holding such tightly in position upon the ring shaped member which is constructed of strip 46.

In order to operate the fruit picker 20 of this invention, the operator merely extends the operating end 24 until a piece of fruit 72 is located within the internal chamber 62. At that particular time, the stem of the fruit should be conducted through one of the recesses 56. The operator then merely exerts a manual force against the stem which will cause the stem to separate from the tree resulting in the fruit 72 to fall and be collected within the bag 64. This procedure is repeated until the desired amount of fruit is picked or the tree is completely picked of fruit.

What is claimed is:

1. A fruit picker comprising:

an elongated adjustable length handle having an inner end and an outer end, said inner end adapted to be held by the user;

a ring shaped member attached to said elongated handle at said outer end, an internal chamber enclosed by said ring shaped member, said ring shaped member having an upper surface and a lower surface, said upper surface including a scalloped arrangement, said ring shaped member having a plurality of spaced-apart openings, said openings connecting with a groove formed within the exterior of said ring shaped member;

a bag-like collecting container; and a rigid but bendable band having a plurality of spaced-apart protuberances, a said protuberance to be snugly insertable within a said opening with a part of the side wall of said collecting container being located between said protuberance and the wall of said opening, said band being tightly held within said groove forming an interlocking between said band and said ring shaped member and said collecting container, said band to be removable to permit changing of said collecting container, whereby a stem of a piece of fruit is to connect with said hiatus means with the fruit being located within said internal chamber and upon exerting a force against the stem the stem will separate from the tree and the fruit will drop into said collecting container.

* * * * *